US010958557B2

(12) United States Patent
Burton et al.

(10) Patent No.: US 10,958,557 B2
(45) Date of Patent: Mar. 23, 2021

(54) AUTOMATED DEPLOYMENT OF A PRIVATE MONITORING NETWORK

(71) Applicant: INTERNATIONAL BUSINESS MACHINES CORPORATION, Armonk, NY (US)

(72) Inventors: Michael Burton, Austin, TX (US); Jes Kiran Chittigala, Kukatpally (IN); Venkateshwar R. Yerravalli, Hyderabad (IN); Ravi A. Shankar, Austin, TX (US); Perinkulam I. Ganesh, Round Rock, TX (US); Esdras E. Cruz-Aguilar, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/528,206

(22) Filed: Jul. 31, 2019

(65) Prior Publication Data
US 2021/0036945 A1 Feb. 4, 2021

(51) Int. Cl.
*H04L 12/00* (2006.01)
*H04L 12/26* (2006.01)
(Continued)

(52) U.S. Cl.
CPC .............. *H04L 43/50* (2013.01); *G06F 9/455* (2013.01); *G06F 9/5077* (2013.01)

(58) Field of Classification Search
CPC ......... H04L 43/04; H04L 41/22; H04L 41/12; G06N 20/00
(Continued)

(56) References Cited

U.S. PATENT DOCUMENTS 5,796,942 A * 8/1998 Esbensen ............ H04L 63/1408
709/229
6,662,221 B1 * 12/2003 Gonda ................ H04L 12/4641
370/254

(Continued)

OTHER PUBLICATIONS

C. Aiftimiei et al., "Cloud Environment Automation: from infrastructure deployment to application monitoring", IOP Conf. Series: Journal of Physics: Conf. Series 898 (2017).

*Primary Examiner* — Frantz Coby
(74) *Attorney, Agent, or Firm* — David Quinn; Brian F. Russell (57) ABSTRACT

A processor, based on detection of a configuration change to a central electronics complex (CEC) in a CEC group, automatically creates a monitoring network within the CEC. Automatically creating the monitoring network includes the processor issuing a request via a hardware management console (HMC) to the CEC to create a virtual switch implementing a virtual local area network (VLAN). The processor also issues a request via the HMC to the CEC to create, on a virtual input-output server (VIOS) hosted in the CEC, a virtual trunk adapter connected to the VLAN. In addition, the processor issues a request via the HMC to the CEC to create, on each of a plurality of logical partitions (LPARs) hosted in the CEC, a virtual network adapter connected to the VLAN. The processor can employ the network, for example, to monitor health of the LPARs and VIOS within the CEC via the HMC.

21 Claims, 8 Drawing Sheets

(51) Int. Cl.
  *G06F 9/50* (2006.01)
  *G06F 9/455* (2018.01)
(58) Field of Classification Search
  USPC .................................................. 709/224, 223
  See application file for complete search history.

(56) References Cited

U.S. PATENT DOCUMENTS

| | | | |
|---|---|---|---|
| 6,832,247 B1* | 12/2004 | Cochran | H04L 43/00 |
| | | | 709/222 |
| 7,577,701 B1 | 8/2009 | Johns et al. | |
| 8,230,058 B2 | 7/2012 | Joels et al. | |
| 8,904,529 B2* | 12/2014 | Ward | H04L 63/1408 |
| | | | 726/23 |
| 9,003,527 B2* | 4/2015 | Bhagwat | H04W 12/0808 |
| | | | 726/23 |
| 9,148,465 B2 | 9/2015 | Gambardella et al. | |
| 10,142,353 B2* | 11/2018 | Yadav | H04L 43/04 |
| 10,200,252 B1 | 2/2019 | Qin et al. | |
| 10,263,856 B2* | 4/2019 | Fried | H04L 41/22 |
| 2007/0019568 A1* | 1/2007 | Velupillai | H04L 12/4641 |
| | | | 370/254 |
| 2009/0316585 A1* | 12/2009 | Srinivasan | H04W 24/02 |
| | | | 370/241 |
| 2016/0261465 A1* | 9/2016 | Gupta | H04L 41/14 |
| 2017/0005880 A1* | 1/2017 | Fried | H04L 41/12 |
| 2017/0237254 A1* | 8/2017 | Meagher | G06N 20/00 |
| | | | 700/291 |
| 2018/0314439 A1 | 11/2018 | Graham et al. | |

* cited by examiner

AUTOMATED DEPLOYMENT OF A PRIVATE MONITORING NETWORK

BACKGROUND OF THE INVENTION

The present disclosure relates in general to data processing and, in particular, to managing enterprise scale data processing systems. Still more particularly, the present disclosure relates to automated deployment and removal of a private monitoring network, for example, in a central electronics complex (CEC) group.

Enterprise continuity requires that large scale enterprises, such as corporate and governmental entities and educational institutions, have a highly available (HA) information technology (IT) infrastructure suitable for storing the enormous amounts of data generated and gathered by the enterprise and for timely completing the computational workloads of the enterprise. In the past, the HA IT infrastructure required by an enterprise was exclusively provided by on-premises hardware, for example, a collection of servers interconnected in a clustered topology. However, the large scale and redundancy of a HA IT infrastructure presents significant technical challenges in system deployment and management, leading many enterprises to transition at least some of their IT requirements to a cloud computing environment in which one or more third party vendors deliver Infrastructure as a Service (IaaS), Platform as a Service (PaaS), and/or Software as a Service (SaaS).

Regardless of whether implemented on-premises and/or in a cloud computing environment, the underlying physical infrastructure of a typical HA computing environment includes a plurality of central electronics complexes (CECs), which each contain some number of central processing units (CPUs), physical memory, and a network adapter. For example, a CEC may be realized as one or more physical server computers. To simplify deployment and management of these physical computing resources, which may be heterogeneous and geographically distributed, the multiple CECs can be jointly provisioned and managed as a central electronics complex (CEC) group.

In a typical implementation, the CEC group is utilized to host a large number (e.g., on the order of hundreds or more) of logical partitions (LPARs), which are virtual computers that each execute a separate instance of an operating system and that are each assigned a subset of the CEC group's hardware resources. In some cases, the LPARs can be executed by or on behalf of different enterprises. The CEC group can be managed to instantiate LPARs, relocate individual LPARs, and remove LPARs as needed to deliver the desired IT services.

In order to facilitate sharing of physical resources of the CEC group between LPARs, management software referred to as a virtual input-output server (VIOS) can be implemented in a management LPAR. The VIOS can provide, for example, a virtual Small Computer Serial Interface (SCSI) target, virtual Fibre Channel, shared Ethernet adapters, and data storage sharing capability to client LPARs within the CEC group.

BRIEF SUMMARY

The present disclosure appreciates that active management of a CEC group requires monitoring of the health, resource utilization, and other information regarding each of the LPARs hosted by the CEC group. In various deployments, this LPAR monitoring is subject to technical challenges and/or security concerns. For example, the VIOSs executing within each CEC of the CEC group are commonly communicatively coupled to one or more hardware management consoles (HMCs); however, in at least some cases, an HMC cannot be used to directly monitor LPARs due to security restrictions. Further, LPARs cannot communicate monitoring information with VIOSs over existing networks within the CEC group, as LPARs are typically not aware of the VIOSs that provision them. In addition, because the LPARs run private workloads (on behalf of possibly different enterprises), the monitoring information should not be visible to other LPARs, and an LPAR should not be able to be spoofed by another LPAR. An additional challenge is the dynamic nature of the configuration of the virtualized resources instantiated in the CEC group. As computational workloads change, different numbers of LPARs, switches, and virtual trunk adapters are created on-the-fly. Consequently, manual deployment of monitoring infrastructure during run time is not practical.

In at least one embodiment, the challenges of LPAR monitoring are addressed by a controller system that provides automated deployment and removal of a private monitoring network for a central electronics complex (CEC) group.

According to at least one embodiment, based on detection of a configuration change to a central electronics complex (CEC) in a CEC group, a processor (e.g., of a controller system) automatically creates a monitoring network within the CEC. Automatically creating the monitoring network includes the processor issuing a request via a hardware management console (HMC) to the CEC to create a virtual switch implementing a virtual local area network (VLAN). The processor also issues a request via the HMC to the CEC to create, on a virtual input-output server (VIOS) hosted in the CEC, a virtual trunk adapter connected to the VLAN. In addition, the processor issues a request via the HMC to the CEC to create, on each of a plurality of logical partitions (LPARs) hosted in the CEC, a virtual network adapter connected to the VLAN. The processor can then employ the network, for example, to monitor the health of the LPARs and VIOS within the CEC via the HMC.

DETAILED DESCRIPTION

Figure 1:
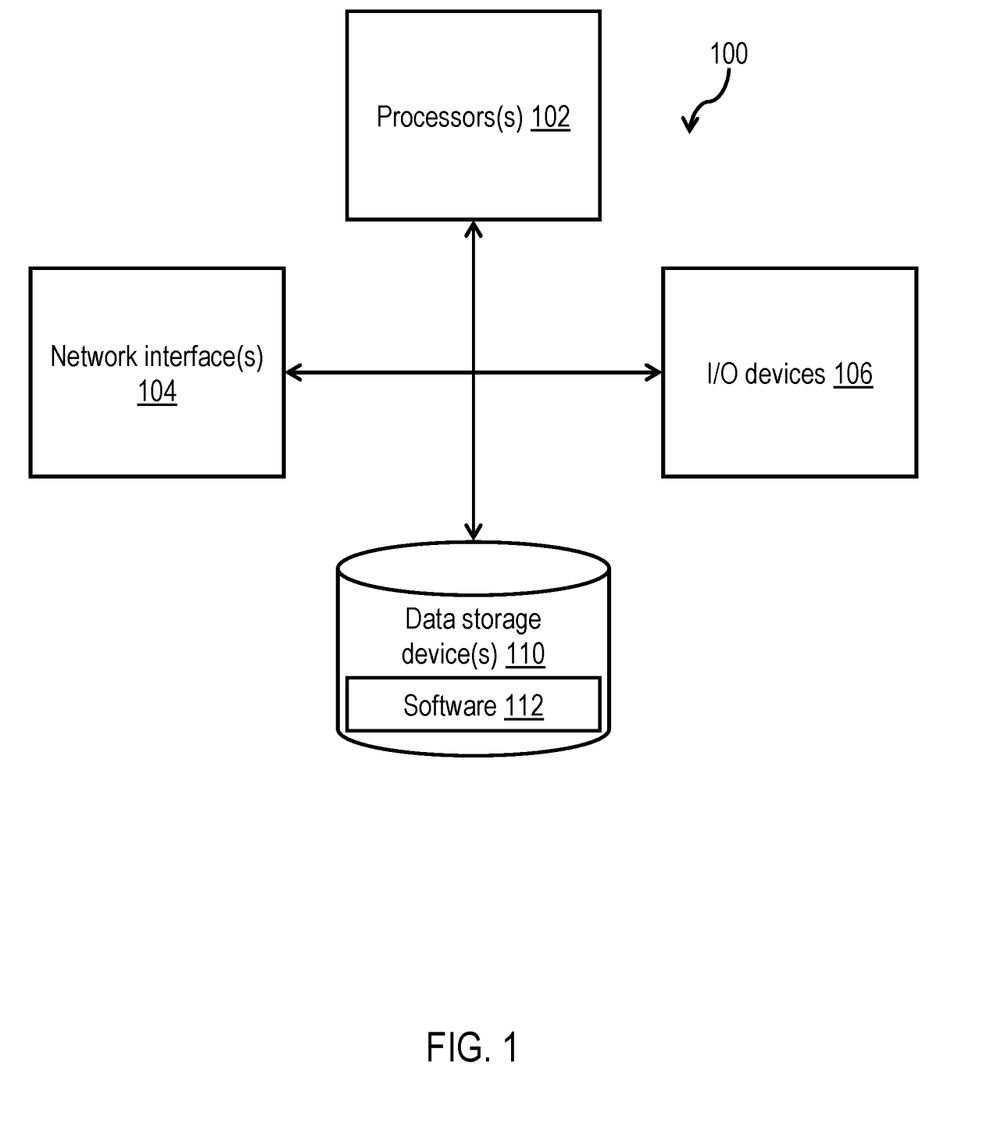
FIG. 1 is a high-level block diagram of an illustrative data processing system in accordance with one embodiment.

With reference now to the figures and, in particular, with reference to FIG. 1, there is illustrated a data processing system 100 in accordance with one embodiment. In the illustrated exemplary embodiment, data processing system 100 includes one or more processors 102 that process data and program code, for example, to ingest, manage, access, manipulate, output and/or store data and/or software. Data processing system 100 additionally includes one or more network interfaces 104 coupled to processor(s) 102 that permit data processing system 100 to communicate with data sources and/or one or more other data processing systems (e.g., other member data processing systems of a central electronics complexes (CECs) of a CEC group) via cabling and/or one or more wired or wireless, public or private, local or wide area networks (including the Internet).

Data processing system 100 also includes input/output (I/O) devices 106, such as ports, displays, and attached devices, etc., which receive inputs and provide outputs of the processing performed by data processing system 100 and/or other resource(s) in its data processing environment. Finally, data processing system 100 includes one or more data storage device(s) 110 coupled to processor(s) 102. Data storage device(s) 110 may include, for example, one or more volatile or non-volatile storage devices, including cache memories, system memories, solid state drives, optical or magnetic disk drives, etc. Data storage device(s) 110 may store, for example, input data to be processed by processor(s) 102 and/or data results of processing by processor(s) 102. In addition, data storage device(s) 110 may store software 112 for directing the execution of processor(s) 102 and/or controlling the functions of the data processing system components illustrated in FIG. 1. Generally, software 112 may include routines, programs, objects, components, logic, data structures, and so on that perform particular tasks or implement particular abstract data types. If data processing system 100 is implemented as a portion of a distributed computing environment, modules of software 112 may be executed in data processing system 100 and/or in other remote data processing systems, and data processing system 100 may additionally execute modules of software residing in the other remote data processing systems. Examples of software 112 are discussed in greater detail below.

In various embodiments, data processing system 100 may be, for example, a server computer system, desktop computer, laptop computer, tablet computer, smartphone, or embedded system (e.g., an Internet-of-things (TOT) device). In some examples, data processing system 100 may be a cloud computing node. It should be understood that the high level block diagram provided in FIG. 1 is not exhaustive and that various embodiments may include different suitable combinations of hardware, software, and firmware.

Figure 2:
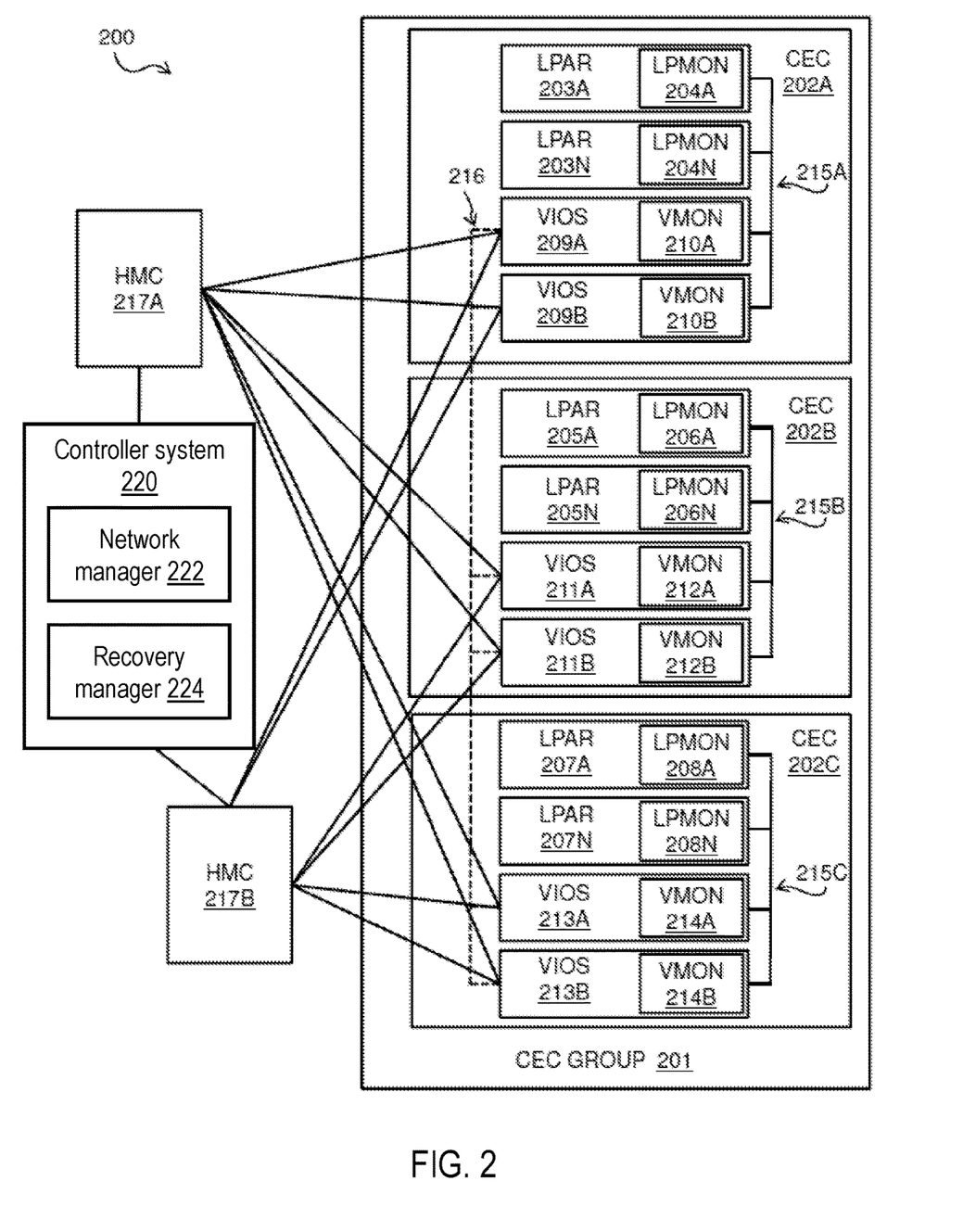
FIG. 2 is a high-level block diagram of a data processing environment in accordance with one embodiment.

Referring now to FIG. 2, there is depicted a block diagram of an embodiment of a data processing environment 200 in accordance with one embodiment. As shown, data processing environment 200 includes a plurality of CECs 202A, 202B, 202C that form a CEC group 201. As will be appreciated, one or more of CECs 202 may be collocated at one physical location or may be geographically distributed. Each of CECs 202 is communicatively coupled to redundant hardware management consoles (HMCs) 217A, 217B for implementing CEC group management. HMCs 217A, 207B are, in turn, communicatively coupled to a controller system 220 executing orchestrating software through which the operation of CEC group 201 is monitored and managed. In at least some embodiments, each of CECs 200, HMCs 217, and controller system 220 can be (but is not required to be) implemented with a respective data processing system 100 as shown in FIG. 1.

In the illustrated example, CEC 202A hosts a plurality of LPARs 203A-203N, CEC 202B hosts a plurality of LPARs 205A-205N, and CEC 202C hosts a plurality of LPARs 207A-207N. Each of these LPARs executes a respective one of LPAR monitors 204A-204N, 206A-206N, or 208A-208N. Each CEC 202 additionally hosts a respective pair of redundant VIOSs 209A-209B, 211A-211B, or 213A-213B, which provides access to the physical resources of the underlying CEC 202 to the LPARs hosted on that CEC 202. Each of these VIOSs includes a respective one of VIOS monitors 210A, 210B, 212A, 212B, 214A, and 214B. LPARs 203A-203N and VIOS 209A-209B in CEC 202A are communicatively coupled by one or more virtual local area networks (VLANs) 215A. Similarly, LPARs 205A-205N and VIOS 211A-211B in CEC 202B are communicatively coupled by one or more VLANs 215B, and LPARs 207A-207N and VIOSs 213A-213B in CEC 202B are communicatively coupled by one or more VLANs 215C.

LPAR monitors 204A-204N, 206A-206N, and 208A-208N report health data (e.g., heartbeat messages) to their respective VIOSs 209A-209B, 211A-211B, or 213A-213B via VLANs 215A, 215B, and 215C, respectively. VIOS monitors 210A-210B, 212A-212B, and 214A-214B collect the LPAR health data from the LPAR monitors, and responsive to REpresentational State Transfer (REST) application programming interface (API) queries from controller system 220, send LPAR and VIOS health data in eXtensible Markup Language Schema Definition (XSD) response packets to controller system 220 via either HMC 217A or 217B. Controller system 220 can then utilize the LPAR and VIOS health data to manage CEC group 201, including by instantiating, relocating, and deleting LPARs. When an LPAR is instantiated, a new private VLAN between the LPAR and the pre-existing VIOSs within the CEC hosting the LPAR is created automatically. If the LPAR was relocated from another CEC, the private VLAN in the CEC from which the LPAR was relocated is dismantled.

Although not required, FIG. 2 further illustrates that CECs 202A-202C in CEC group 201 can be clustered as a shared storage pool (SSP) 216, which communicatively couples VIOSs 209A-209B, 211A-211B, and 213A-213B across CECs 202A-202C. By virtue of the clustering of VIOSs 209, 211, and 213, health data regarding an LPAR hosted by any CEC 202 in CEC group 201 can be received by any VIOS 209, 211, or 213 and are shared by all VIOSs 209, 211, and 213 in CEC group 201. Consequently, any VIOS can report requested LPAR and VIOS health data back to controller system 220 via an HMC 217.

As noted above, CEC group 201 is monitored and managed by controller system 220, which is implemented on physical platform outside of CEC group 201. Due to security concerns, controller system 220 may not be permitted to communicate directly with LPARs 203, 205, and 207 and VIOSs 210, 212, and 214 in CEC group 201. Instead, communications between controller system 220 and the VIOSs and LPARs is intermediated by HMCs 217A-217B, which are redundantly communicatively coupled to each of VIOSs 209A-209B, 211A-211B, and 213A-213B across all of CECs 202A-202C to provide high availability. Thus, if one HMC 217 fails, controller system 220 may utilize the other HMC 217 to continue to monitor and manage CEC group 201 without interruption.

In the depicted example, controller system 220 includes a network manager 222, which is responsible for the automated deployment and removal of the monitoring VLANs 215A, 215B and 215C. In addition, controller system 220 includes recovery manager 224, which gathers health information regarding the LPARs and VIOSs hosted by CEC group 201 and, based on the LPAR and VIOS health information, recovers from failures of LPARs and VIOSs and relocates LPARs, as needed.

In general, VIOSs and LPARs managed by HMCs 217 are not permitted to initiate the communication of messages to controller system 220 via HMCs 217. Consequently, health monitoring of VIOSs and LPARS in the CEC group 201 cannot be event-driven. Recovery manager 224 therefore collects health information regarding VIOSs 209A-209B, 211A-211B, and 213A-213B and LPARs 203A-203N, 205A-205N, and 207A-207N by initiating health probes (e.g., communicated as REST API queries) that are sent from controller system 220 via HMCs 217A-217B to VIOSs 209, 211, and 213. VIOSs 209, 211, and 213 return the health information for CEC group 201 to controller system 220 in XSD response packets. Recovery manager 224 can then record the heath information in an appropriate data structure and make LPAR and VIOS relocation decisions based on the recorded health information.

As depicted in FIG. 2, it is preferred for high availability if each CEC 202 hosts at least two VIOSs. The state of these VIOSs is available to all other VIOSs in CEC group 201 by virtue of the clustering provided by SSP 216. If all VIOSs within a given CEC 202 are determined to be unhealthy by recovery manager 224 based on a XSD response packet provided by a healthy VIOS in another CEC 202, recovery manager 224 may instruct controller system 220 to relocate all the LPARs within that given CEC 202 to a different CEC 202 of CEC group 201. Similarly, the health of any LPAR hosted in CEC group 201 is available to any VIOS via SSP 216. If an individual LPAR is detected to be unhealthy (e.g., due to a missed heartbeat message), any healthy VIOS may report the LPAR's health state to recovery manager 224 in an XSD response packet. Recovery manager 224 may then instruct controller system 220 to relocate the unhealthy LPAR to another CEC 202 within CEC group 201.

In at least some embodiments, the LPARs within each CEC 202 send periodic heartbeat messages to the VIOSs within that CEC 202. For example, in CEC 202A, LPARs 203A-203N may send periodic heartbeat messages to VIOSs 209A-209B. The VIOSs maintain a count of missed heartbeat messages for each of LPARs in the CEC 202. In such embodiments, an XSD response packet responding to a health probe may report a list including only the LPARs in CEC group 201 that have missed heartbeat messages. In this manner, the volume of the health information that is returned in the XSD response packets is reduced.

In order to reduce network traffic through HMCs 217A-217B, recovery manager 224 may send a health probe at predefined time intervals (e.g., once every 20 seconds). In some implementations, a first REST API query type may be utilized collect health information regarding VIOSs, and a different second REST API query type may be utilized to collect health information regarding LPARs. In some embodiments, health probes of the first type utilized to obtain VIOS health information may be transmitted more frequently than the health probes of the second type used to obtain LPAR health information.

In some embodiments, controller system 220 may be in communication with multiple CEC group islands, which comprise one or more CEC groups that are isolated from one another and thus do not all belong to the same SSP. In such embodiments, recovery manager 224 cannot obtain the health information for the entire topology by transmitting a health probe to a single VIOS, but rather only health information regarding VIOSs and LPARs located in the same CEC group island. Therefore, recovery manager 224 may send separate health probes to each CEC group island. Recovery manager 224 may also determine based on received XSD response packets which VIOSs and LPARS are hosted in which CEC group islands and record this topology information in addition to the LPAR and VIOS health information.

It should be appreciated that FIG. 2 is not intended to indicate that data processing environment 200 is required to include all of the components depicted therein. Rather, data processing environment 200 can include any appropriate fewer or greater number of components. For example, a CEC may host any appropriate number of VIOSs in various embodiments, and a controller system may be in communication with any appropriate number of CEC groups, which may be divided into any appropriate number of CEC group islands. Further, the various embodiments of data processing environment may be implemented with any appropriate logic, including any suitable hardware platform (e.g., a processor, an embedded controller, or an application specific integrated circuit, among others), software (e.g., operating and application software, among others), firmware, or any suitable combination of hardware, software, and firmware, in various embodiments.

As briefly described above, active management of a CEC group, such as CEC group 201 of FIG. 2, typically entails monitoring of the health, resource utilization, and other information regarding each of the LPARs hosted by the CEC group. However, manual deployment of monitoring infrastructure during run time is not practical, given the large number of LPARs hosted by the CEC group and the dynamic relocation of LPARs within the CEC group. Accordingly, in at least one embodiment, the controller system of the CEC group (e.g., controller system 220) provides monitoring of LPARs through a virtual private monitoring network that is automatically deployed and/or removed by the controller system as needed. In FIG. 2, these virtual private monitoring networks are depicted by VLANs 215A, 215B, and 215C.

Figure 3:
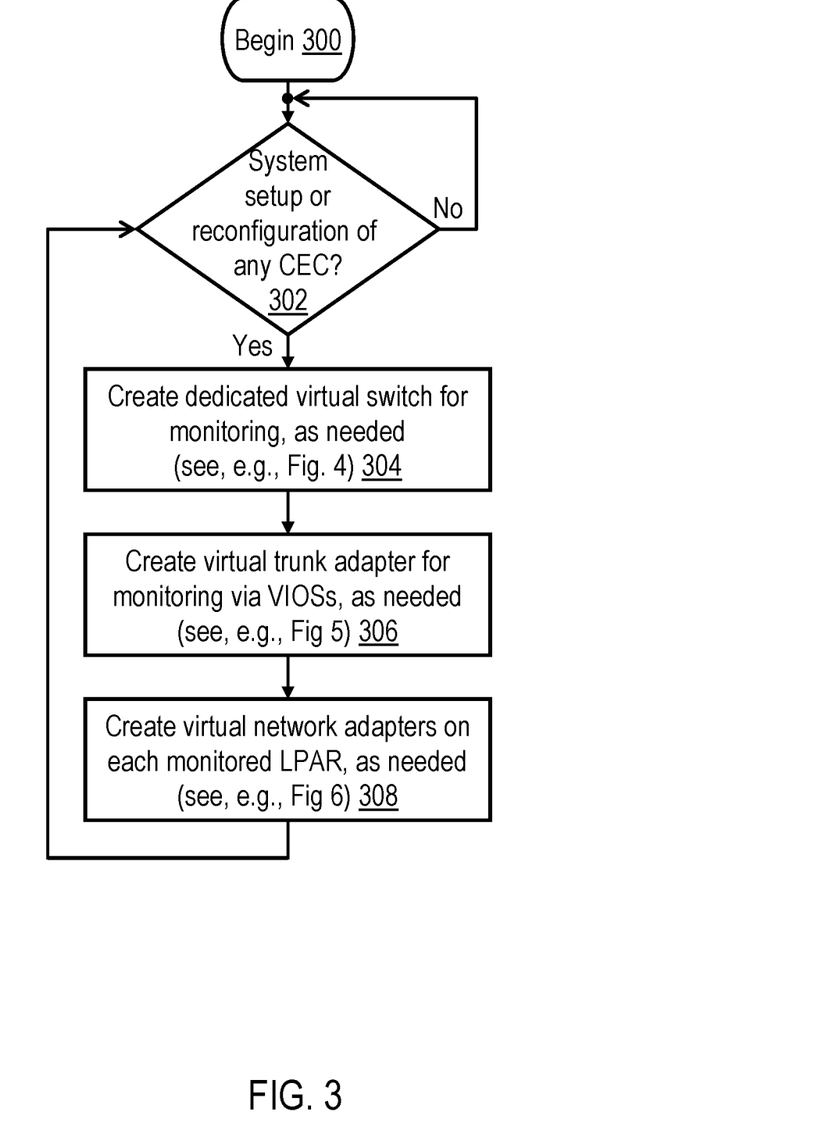
FIG. 3 is a high-level logical flowchart of an exemplary process for automatically deploying a virtual monitoring network in a CEC group in accordance with one embodiment.

FIG. 3 illustrates a high-level logical flowchart of an exemplary process by which a controller system automatically deploys a virtual monitoring network in a CEC group in accordance with one embodiment. The process of FIG. 3 can be performed, for example, by controller system 220 of FIG. 2. In at least some embodiments, the process is performed in the background during the discovery process at system setup in which one or more CECs 202 are added to the management configuration of controller system 220, as well as in the background as the discovery process is run after a system change.

The process of FIG. 3 begins at block 300 and then proceeds to block 302, which illustrates controller system 220 detecting whether or not a configuration change, such as a system setup or reconfiguration, to any CEC 202 in CEC group 201 has occurred. If controller system 220 does not detect system setup or reconfiguration of any CEC 202 in CEC group 201 at block 302, the process continues to iterate at block 302. In response to controller system 220 detecting a system setup or reconfiguration of a CEC 202 in CEC group 201 at block 302, the process of FIG. 3 proceeds to blocks 304-308.

Blocks 304-308 depict controller system 220 automatically deploying a private virtual network for one-way monitoring of the new or reconfigured CEC 202. At block 304, controller system 220 first creates a virtual switch dedicated for monitoring within the new or reconfigured CEC 202, as needed. An exemplary process for creating the virtual switch is described in greater detail below with reference to FIG. 4. Controller system 220 then creates a virtual trunk adapter on each VIOS to be utilized for monitoring within the CEC 202, as needed (block 306). An exemplary process for creating the virtual trunk adapter(s) is described in greater detail below with reference to FIG. 5. Controller system 220 finally creates redundant network adapters on each LPAR to be monitored within the CEC group 202, as needed (block 308). An exemplary process for creating the network adapters is described in greater detail below with reference to FIG. 6. Following block 308, the process of FIG. 3 returns to block 302, which has been described.

Figure 4:
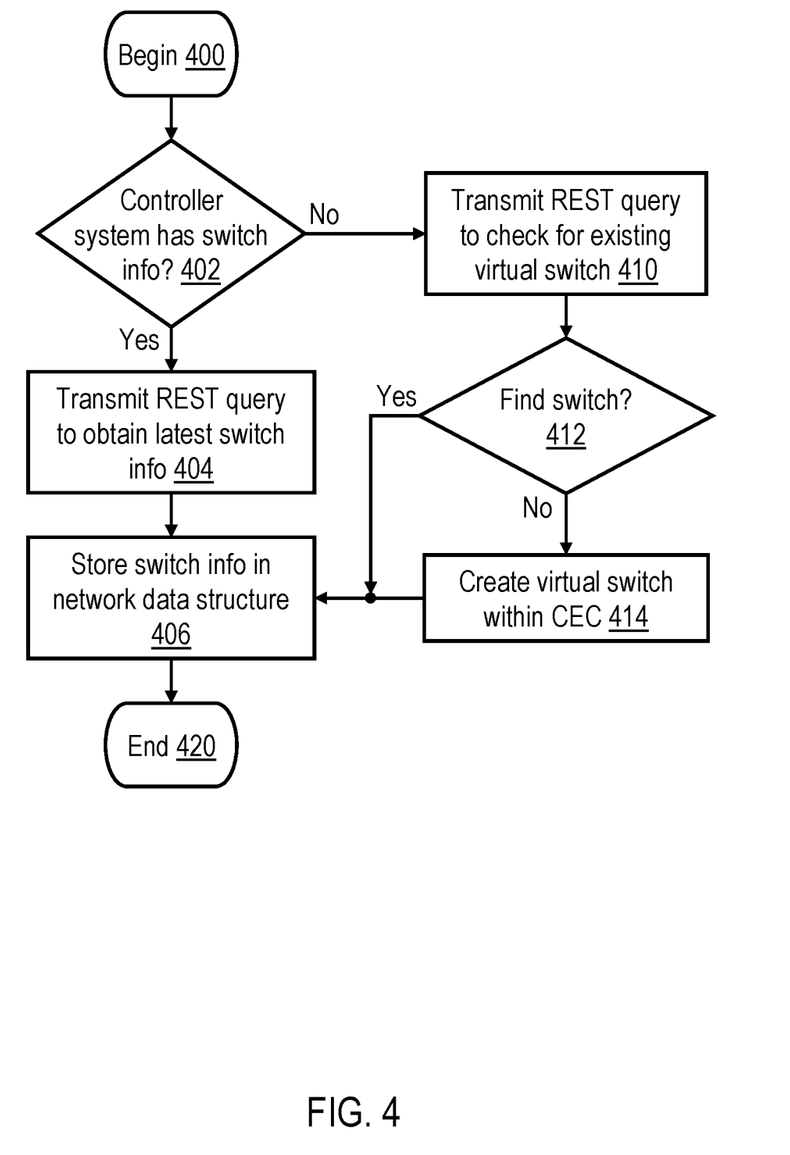
FIG. 4 is a high-level logical flowchart of an exemplary process for creating a dedicated virtual switch for a monitoring network in accordance with one embodiment.

Referring now to FIG. 4, there is depicted a high-level logical flowchart of an exemplary process for creating a dedicated virtual switch for a monitoring network in accordance with one embodiment. As noted above, the illustrated process can be performed for a particular CEC 202 at block 304 of FIG. 3.

The process of FIG. 4 begins at block 400 and then proceeds to block 402, which illustrates controller system 220 determining whether or not network manager 222 has recorded within a network information data structure (e.g., its persistent attributes) any information pertaining to a virtual switch in the particular CEC 202. If not, the process passes to block 410 and following blocks, which are described below. If, however, controller system 220 determines at block 402 that the network information data structure contains information pertaining to a virtual switch in the particular CEC 202, controller system 220 transmits a REST request to the particular CEC 202 via an HMC 217 in order to obtain the most up-to-date information for the virtual switch (block 404). In response to receipt of an XSD response to the REST query containing the requested information for the virtual switch, controller system 220 updates the network information data structure with the switch information (block 406). Thereafter, the process of FIG. 4 ends at block 420.

Referring now to block 410, if controller system 220 does not store information regarding a virtual switch in the particular CEC 202, controller system 220 transmits a REST request to the particular CEC 202 via an HMC 217 in order to check for the existence of a virtual switch within the particular CEC 202. In response to receipt of an XSD response to the REST query issued at block 410, controller system 220 determines from the XSD response whether or not a virtual switch exists in the particular CEC 202 and, if so, its switch information (block 412). If controller system 220 determines at block 412 that the particular CEC 202 is already hosting a virtual switch for monitoring, controller system 220 updates the network information data structure with the switch information for the existing switch (e.g., its Universally Unique Identifier (UUID)) (block 406). If, however, controller system 220 determines at block 412 that the particular CEC 202 does not already host a virtual switch for monitoring, controller system 220 creates a virtual switch for monitoring within the particular CEC 202 through issuing the REST API using PUT (block 414). If, for any reason, the switch fails to be created at block 414, the discovery process will be failed. In one preferred embodiment, the virtual switch created at block 414 is named after the peer domain with "_VSWITCH" following. For example, if the peer domain name is "EXAMPLE", the switch name will be "EXAMPLE_VSWITCH". Following block 414, the process passes to block 406, which depicts controller system 220 updating the network information data structure with the switch information of the newly created switch (e.g., UUID). Following block 406, the process of FIG. 4 ends at block 420.

Following completion of the process of FIG. 4, the CEC 202 will contain a virtual switch that can be utilized to communicate one-way monitoring traffic from the LPARs to the locally hosted VIOSs. For example, in exemplary CEC 700 of FIG. 7, which can be utilized to implement any of CECs 202A-202C of FIG. 2, the process of FIG. 4 can be utilized to create virtual switch 702. In a preferred embodiment, two dedicated networks 704A, 704B having respective virtual local area network (VLAN) IDs exist on virtual switch 702 to provide monitoring redundancy. In a preferred embodiment, virtual switch 702 is configured as a Virtual Edge Port Aggregator (VEPA) in accordance with the IEEE 802.1Qbg standard.

Figure 5:
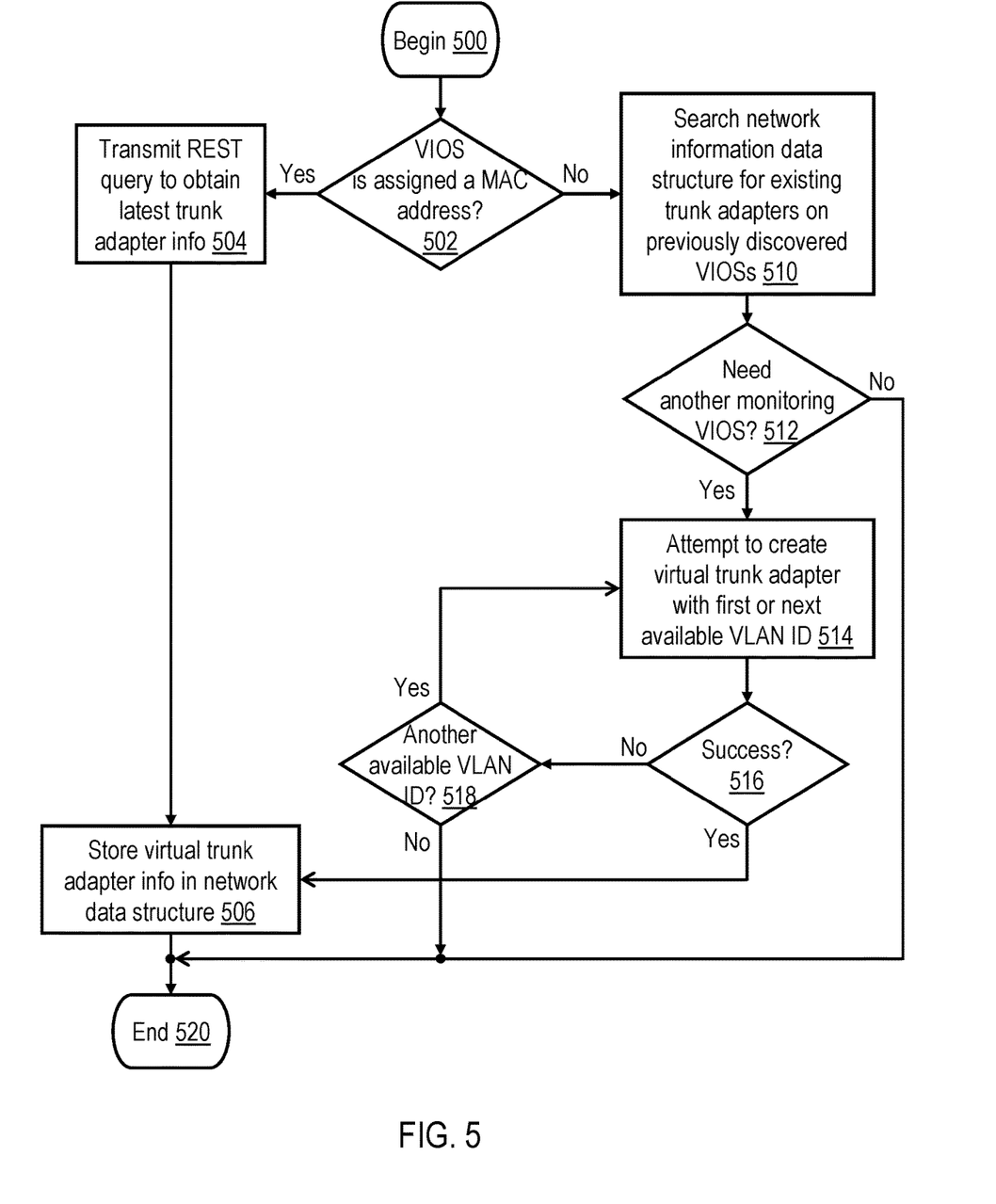
FIG. 5 is a high-level logical flowchart of an exemplary process for creating a virtual trunk adapter for a monitoring network in accordance with one embodiment.

With reference now to FIG. 5, there is illustrated a high-level logical flowchart of an exemplary process for creating a virtual trunk adapter for a monitoring network in accordance with one embodiment. As noted above, the illustrated process can be performed for a particular CEC 202 at block 306 of FIG. 3. The process of FIG. 5 is preferably performed for at least two VIOSs discovered in the particular CEC 202 during the discovery process.

The process of FIG. 5 begins at block 500 and then proceeds to block 502, which illustrates a determination whether or not the VIOS under consideration has an assigned media access control (MAC) address. If so, controller system 220 transmits a REST query via an HMC 217 to obtain up-to-date virtual trunk adapter information for the VIOS (block 504). In response to receipt of an XSD response to the REST query, controller system 220 stores the virtual trunk adapter information (e.g., MAC address) from the XSD response in the network information data structure (block 506).

Returning to block 502, in response to a determination that the discovery process did not provide a MAC address on the virtual network for the VIOS under consideration, controller system 220 searches its network information data structure for any existing virtual trunk adapters on previously discovered VIOSs within the particular CEC 202 (block 510). At block 512, controller system 220 determines whether or not at least the network information data structure records at least two VIOSs within CEC 202 that are already configured to serve as monitors or if additional monitoring VIOSs are needed. If controller system 220 determines at block 512 that at least two VIOSs within CEC 202 are already configured to serve as monitors, the process of FIG. 5 ends at block 520. If, however, controller system 220 determines at block 512 that fewer than two VIOSs within CEC 202 are already configured to serve as monitors, controller system 220 attempts to create a virtual trunk adapter on the VIOS under consideration utilizing a first or next available VLAN ID by issuing a REST query to the VIOS via an HMC 217 (block 514). If controller system 220 determines at block 516 that the creation of the virtual trunk adapter on the VIOS under consideration was successful, the process passes to block 506, which has been described. If, however, controller system 220 determines at block 516 that the attempt to create a virtual trunk adapter on the VIOS was unsuccessful, controller system 220 additionally determines at block 518 whether or not another VLAN ID is available to be tried. If not, the process of FIG. 5 passes to block 520 and ends for the VIOS under consideration. If, on the other hand, controller system 220 determines at block 518 that another VLAN ID is available to be tried, the process returns to block 514, which depicts controller system 220 again attempting to create the virtual trunk adapter on the current VIOS under consideration utilizing the next VLAN ID. In response success in creation of the virtual trunk adapter on the VIOS under consideration at block 516, the process passes to block 506, which has been described.

With the process of FIG. 5, if the first run of the discovery process does not find virtual trunk adapters for the virtual network on any VIOSs, controller system 220 will create virtual trunk adapters on two selected VIOSs (e.g., the first two managed VIOSs discovered by the discovery process). Consider an example in which controller system 220 discovers, for example, four VIOSs (VIOS 1 to VIOS 4) on a CEC, with VIOS 4 already having, unbeknownst to controller system 220, a virtual trunk adapter with the VLAN ID 101. According to the process of FIG. 5, controller system 220 will attempt to create on VIOS 1 a virtual trunk adapter with VLAN ID 101 (the first available VLAN ID) and fail in view of the existing virtual trunk adapter. However, controller system 220 will succeed in creating on VIOS 1 a virtual trunk adapter with the next VLAN ID, namely, VLAN ID 102. Controller system 100 will attempt and fail to create on VIOS 2 and VIOS 3 a virtual trunk adapter with VLAN ID 101, but will not attempt to create a virtual trunk adapter with VLAND ID 102 because that virtual trunk adapter was already created on VIOS 1. As discovery continues, controller system 220 will query VIOS 4, the existing virtual trunk adapter having VLAN ID 101 will be found, and the information regarding the existing virtual trunk adapter will be stored by controller system 220 in its network information data structure.

Referring again to FIG. 7, the process of FIG. 5 will create virtual trunk adapters (VTAs) 706A, 706B on VIOSs 702A and 702B, respectively. Virtual trunk adapter 706A is assigned the VLAN ID of VLAN 704A (e.g., VLAN ID 101), and virtual trunk adapter 706B is assigned the VLAN ID of VLAN 704B (e.g., VLAN ID 102).

Figure 6:
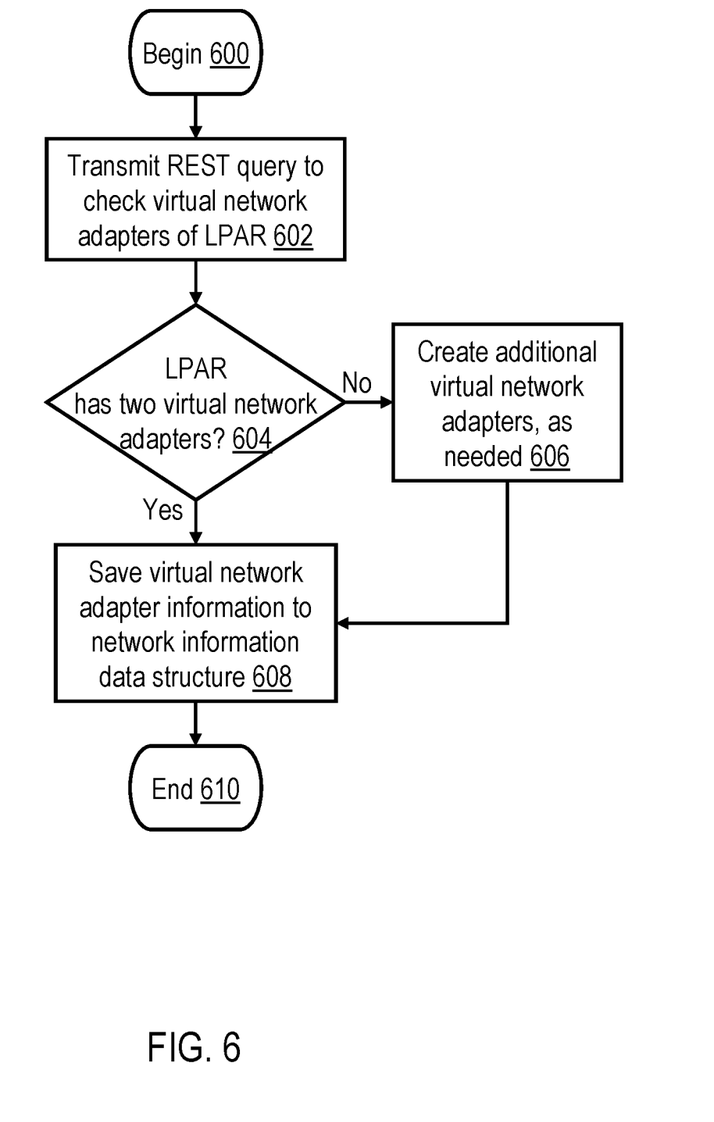
FIG. 6 is a high-level logical flowchart of an exemplary process for creating a virtual network adapter for a monitoring network in accordance with one embodiment.

Referring now to FIG. 6, there is depicted a high-level logical flowchart of an exemplary process for creating a virtual network adapter for a monitoring network in accordance with one embodiment. As noted above, the process of FIG. 6 can be performed for a particular CEC 202 at block 308 of FIG. 3. The process of FIG. 6 is preferably performed for each of the LPARs discovered in the particular CEC 202 during the discovery process.

The process of FIG. 6 begins at block 600 and then proceeds to block 602, which illustrates controller system 220 transmitting a REST query to the CEC 202 via an HMC 217 to check for any existing virtual network adapters on the LPAR under consideration. In response to receipt of the XSD response to the REST query, controller system 220 determines at block 604 whether or not the XSD response indicates that the LPAR currently hosts two virtual network adapters for the two virtual networks supported by the virtual switch created by the process of FIG. 4. If not, controller system 220 creates one or two virtual network adapters on the LPAR via the REST API, as needed to provide two redundant virtual network adapters for the LPAR (block 606). Following block 606 or in response to an affirmative determination at block 604, controller system 220 records information for the virtual network adapters (e.g., MAC addresses and UUIDs) in its network information data structure (block 608). The process of FIG. 6 thereafter ends for the current LPAR at block 610.

Figure 7:
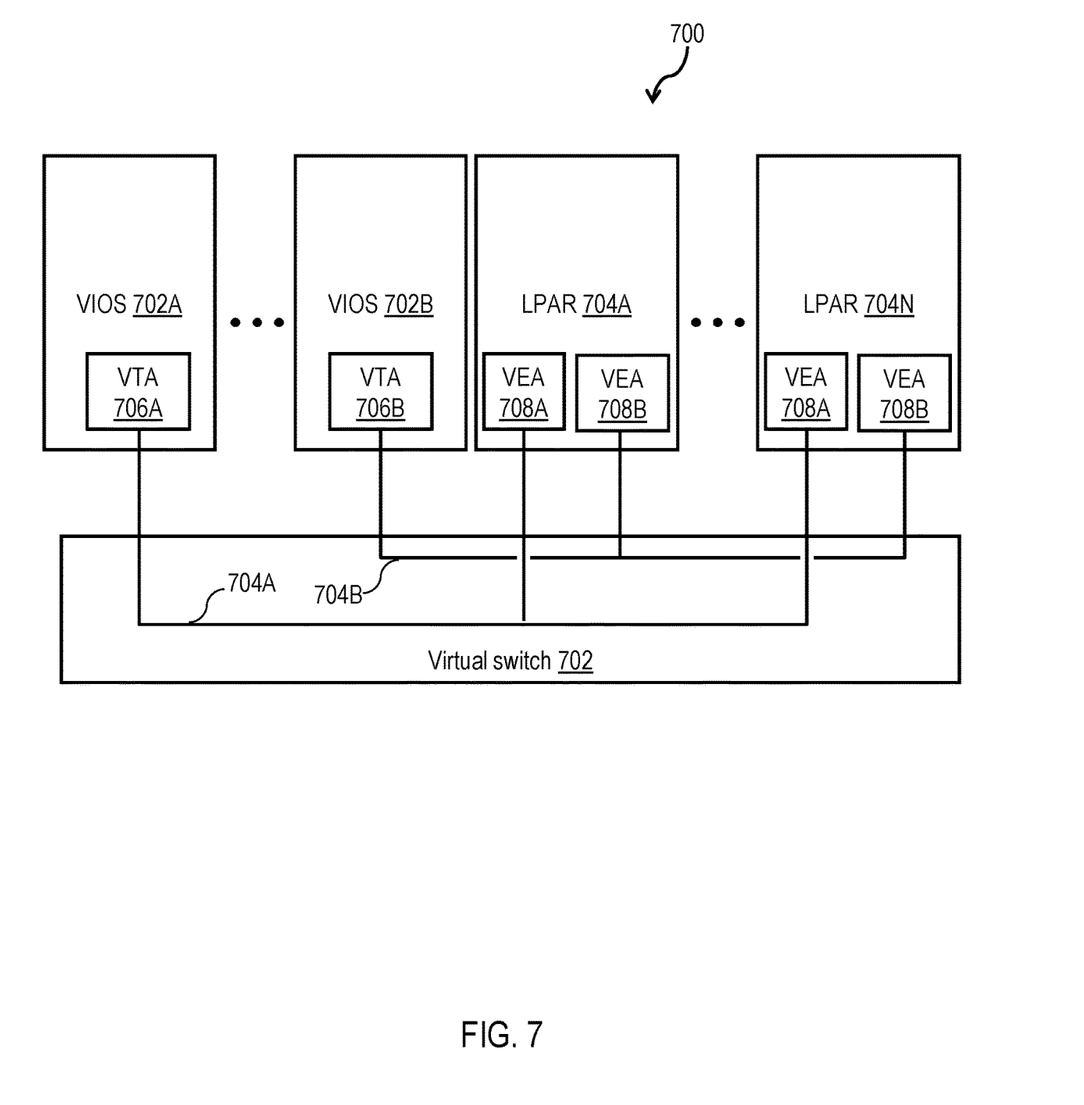
FIG. 7 is a high-level block diagram of a CEC having a virtual monitoring network in accordance with one embodiment.

In the exemplary CEC 700 shown in FIG. 7, the process of FIG. 6 creates two virtual Ethernet adapters (VEAs) 708A, 708B in each of LPARs 704A-704N. Each VEA 708A is connected to VLAN 704A, and each VEA 708B is connected to VLAN 704B. With the components of CEC 700 connected this way, LPARs 704A-704N are enabled to periodically communicate heartbeat messages to VIOSs 702A-702B, and recovery manager 224 is able to collect health information regarding VIOSs 702A-702B and LPARs 704A-704N by initiating health probes (e.g., communicated as REST API queries) to VIOSs 702A-704B via the HMCs 217.

Figure 8:
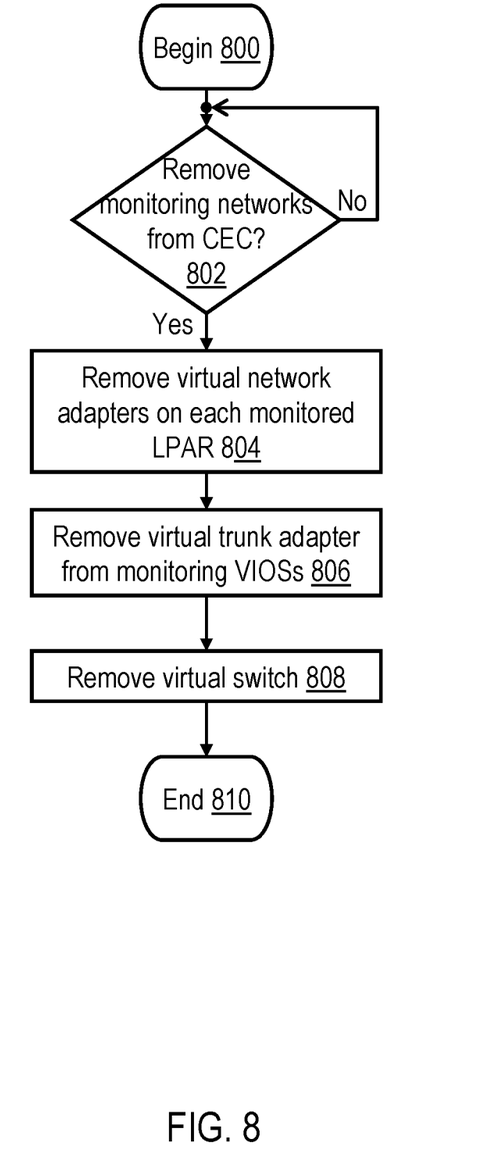
FIG. 8 is a high-level logical flowchart of an exemplary process for automatically removing a virtual monitoring network in a CEC group in accordance with one embodiment.

Referring now to FIG. 8, there is depicted a high-level logical flowchart of an exemplary process for automatically removing a virtual network in a CEC group in accordance with one embodiment. The process of FIG. 8 can be performed automatically by controller system 220, for example, as part of a cleanup and/or deletion process for a CEC 700 as depicted in FIG. 7.

The process of FIG. 8 begins at block 800 and then proceeds to block 802, which depicts controller system 220 determining whether or not to remove monitoring networks (e.g., VLANs 704A-704B) from a CEC 700, for example, because of an upcoming relocation of some or all of LPARs 704A-704N from the CEC 700 and/or removal of a CEC 700 or CEC group from the configuration of the controller system 220. In response to a negative determination, the process simply iterates at block 802. If, however, controller system 220 determines at block 802 to remove monitoring networks from a CEC 700, controller system 220 generally reverses the network creation process illustrated in FIG. 3. In particular, controller system 220 removes the virtual network adapters (e.g., VEAs 708A, 708B) on each monitored LPAR 704 within the CEC 700 by issuing one or more REST queries via HMCs 217 (block 804). In addition, controller system 220 removes the virtual trunk adapters 706 on each monitoring VIOS 702A, 702B within the CEC 700 by issuing one or more REST queries via HMCs 217 (block 806). Finally, controller system 220 removes the virtual switch 702 from CEC 700 by issuing a REST query to the CEC 700 via HMCs 217 (block 808). Thereafter, the process of FIG. 8 ends at block 810.

As has been described, in at least one embodiment, a processor, based on detection of a configuration change to a central electronics complex (CEC) in a CEC group, automatically creates a monitoring network within the CEC. Automatically creating the monitoring network includes the processor issuing a request via a hardware management console (HMC) to the CEC to create a virtual switch implementing a virtual local area network (VLAN). The processor also issues a request via the HMC to the CEC to create, on a virtual input-output server (VIOS) hosted in the CEC, a virtual trunk adapter connected to the VLAN. In addition, the processor issues a request via the HMC to the CEC to create, on each of a plurality of logical partitions (LPARs) hosted in the CEC, a virtual network adapter connected to the VLAN. The processor can then employ the network, for example, to monitor the health of the LPARs and VIOS within the CEC via the HMC.

While various embodiments have been particularly shown and described, it will be understood by those skilled in the art that various changes in form and detail may be made therein without departing from the spirit and scope of the appended claims and these alternate implementations all fall within the scope of the appended claims.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Further, although aspects have been described with respect to a computer system executing program code that directs the functions of the present invention, it should be understood that present invention may alternatively be implemented as a program product including a data storage device storing program code that can be processed by a data processing system. The data storage device can include volatile or non-volatile memory, an optical or magnetic disk, or the like. However, as employed herein, a "data storage device" is specifically defined to include only statutory articles of manufacture and to exclude signal media per se, transitory propagating signals per se, and energy per se.

What is claimed is:

1. A method of data processing in a data processing system including a processor, the method comprising:
the processor, based on detection by the data processing system of a configuration change to a central electronics complex (CEC) in a CEC group, automatically creating a monitoring network within the CEC, wherein automatically creating the monitoring network includes the processor issuing one or more requests via a hardware management console (HMC) to the CEC in the CEC group to cause the CEC to:
create, in the CEC, a virtual switch that implements a virtual local area network (VLAN);
create, on a virtual input-output server (VIOS) hosted in the CEC, a virtual trunk adapter connected to the VLAN; and
create, on each of a plurality of logical partitions (LPARs) hosted in the CEC, a virtual network adapter connected to the VLAN.

2. The method of claim 1, and further comprising the processor obtaining health information regarding at least the plurality of LPARs gathered by the VIOS via the VLAN by issuing queries to the VIOS.

3. The method of claim 1, wherein:
the VIOS is a first VIOS;
the VLAN is a first VLAN;
the virtual trunk adapter is a first virtual trunk adapter; and
the method further comprises the processor issuing another request to the CEC to create, on a second VIOS hosted in the CEC, a second virtual trunk adapter connected to a second VLAN implemented by the virtual switch.

4. The method of claim 1, and further comprising:
the processor automatically updating the monitoring network based on reconfiguration of the CEC.

5. The method of claim 1, wherein:
the processor automatically creates the monitoring network during a discovery process in which the processor discovers virtual components in the CEC group.

6. The method of claim 1, and further comprising:
the processor populating a network information data structure with at least a universally unique identifier (UUID) and media access control (MAC) address of the virtual trunk adapter of the VIOS and the respective virtual network adapters of the plurality of logical partitions.

7. The method of claim 1, and further comprising:
thereafter, the processor automatically removing the monitoring network based on removal of the CEC from a configuration of the CEC group managed by the processor.

8. A data processing system, comprising:
a processor configured to, based on detection by the data processing system of a configuration change to a central electronics complex (CEC) in a CEC group, automatically create a monitoring network within the CEC, wherein the processor automatically creates the monitoring network by issuing one or more requests via a hardware management console (HMC) to the CEC in the CEC group to cause the CEC to:
create, in the CEC, a virtual switch that implements a virtual local area network (VLAN);
create, on a virtual input-output server (VIOS) hosted in the CEC, a virtual trunk adapter connected to the VLAN; and
create, on each of a plurality of logical partitions (LPARs) hosted in the CEC, a virtual network adapter connected to the VLAN.

9. The data processing system of claim 8, wherein the processor is configured to obtain health information regarding at least the plurality of LPARs gathered by the VIOS via the VLAN by issuing queries to the VIOS.

10. The data processing system of claim 8, wherein:
the VIOS is a first VIOS;
the VLAN is a first VLAN;
the virtual trunk adapter is a first virtual trunk adapter; and
the processor is further configured to issue another request to the CEC to create, on a second VIOS hosted in the CEC, a second virtual trunk adapter connected to a second VLAN implemented by the virtual switch.

11. The data processing system of claim 8, wherein the processor is further configured to automatically update the monitoring network based on reconfiguration of the CEC.

12. The data processing system of claim 8, wherein the processor is configured to automatically create the monitoring network during a discovery process in which the processor discovers virtual components in the CEC group.

13. The data processing system of claim 8, wherein the processor is further configured to populate a network information data structure with at least a universally unique identifier (UUID) and media access control (MAC) address of the virtual trunk adapter of the VIOS and the respective virtual network adapters of the plurality of logical partitions.

14. The data processing system of claim 8, wherein the processor is further configured to automatically remove the monitoring network based on removal of the CEC from a configuration of the CEC group managed by the processor.

15. A program product, comprising:
a storage device; and
program code within the storage device and executable by a processor of a data processing system, wherein the program code, when executed, causes the processor, based on detection by the data processing system of a configuration change to a central electronics complex (CEC) in a CEC group, to automatically create a monitoring network within the CEC, wherein the program code causes the processor automatically creates the monitoring network by issuing one or more requests via a hardware management console (HMC) to the CEC in the CEC group to cause the CEC to:
create, in the CEC, a virtual switch that implements a virtual local area network (VLAN);
create, on a virtual input-output server (VIOS) hosted in the CEC, a virtual trunk adapter connected to the VLAN; and
create, on each of a plurality of logical partitions (LPARs) hosted in the CEC, a virtual network adapter connected to the VLAN.

16. The program product of claim 15, wherein the program code, when executed, causes the processor to obtain health information regarding at least the plurality of LPARs gathered by the VIOS via the VLAN by issuing queries to the VIOS.

17. The program product of claim 15, wherein:
the VIOS is a first VIOS;

the VLAN is a first VLAN;

the virtual trunk adapter is a first virtual trunk adapter; and the program code, when executed, causes the processor to issue another request to the CEC to create, on a second VIOS hosted in the CEC, a second virtual trunk adapter connected to a second VLAN implemented by the virtual switch.

18. The program product of claim 15, wherein the program code, when executed, causes the processor to automatically update the monitoring network based on reconfiguration of the CEC.

19. The program product of claim 15, wherein the program code, when executed, causes the processor to automatically create the monitoring network during a discovery process in which the processor discovers virtual components in the CEC group.

20. The program product of claim 15, wherein the program code, when executed, causes the processor to populate a network information data structure with at least a universally unique identifier (UUID) and media access control (MAC) address of the virtual trunk adapter of the VIOS and the respective virtual network adapters of the plurality of logical partitions.

21. The program product of claim 15, wherein the program code, when executed, causes the processor to automatically remove the monitoring network based on removal of the CEC from a configuration of the CEC group managed by the processor.

* * * * *